United States Patent
Wolter

(10) Patent No.: US 6,363,970 B1
(45) Date of Patent: Apr. 2, 2002

(54) VALVE MEANS

(75) Inventor: Eberhard Wolter, Ostfildern (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/634,346

(22) Filed: Aug. 8, 2000

(30) Foreign Application Priority Data

Aug. 11, 1999 (DE) .......................... 199 37 974

(51) Int. Cl.⁷ .................... F15B 13/043; F15B 13/08
(52) U.S. Cl. ...................... 137/625.65; 137/596.16; 137/884
(58) Field of Search ................. 137/596.16, 625.64, 137/884

(56) References Cited

U.S. PATENT DOCUMENTS

| | | | | |
|---|---|---|---|---|
| 5,148,735 A | * | 9/1992 | Veletovac | 137/625.64 X |
| 5,222,715 A | * | 6/1993 | Framberg | 137/596.16 X |
| 5,341,846 A | | 8/1994 | Framberg | |
| 5,487,409 A | | 1/1996 | Stoll et al. | |
| 6,016,838 A | * | 1/2000 | Wigmore | 137/625.64 |

FOREIGN PATENT DOCUMENTS

| | | |
|---|---|---|
| DE | 43 24 939 A1 | 1/1995 |
| EP | 0 643 811 B1 | 3/1998 |
| WO | WO 98/39586 | 9/1998 |

* cited by examiner

Primary Examiner—Gerald A. Michalsky
(74) Attorney, Agent, or Firm—Hoffmann & Baron, LLP

(57) ABSTRACT

A valve means having at least one valve whose housing is longitudinally divided and comprises housing bodies arranged together alongside one another in a parting region. Cavities in the parting region are defined by mutually complementary recesses in the housing bodies placed against each other. The cavities in part form valve ducts and in part are fitted with functional elements. The funcional elements include at least one valve member and at least two electrically operable valve drives serving for the actuation thereof.

21 Claims, 2 Drawing Sheets

VALVE MEANS

BACKGROUND OF THE INVENTION

The invention relates to a valve means which comprises at least one valve, whose valve housing is longitudinally divided and is composed of several, and preferably two, housing bodies which are placed alongside one another in a parting region.

THE PRIOR ART

A valve means of this type is described for example in the European patent publication 0 643 811 B1. In this instance it comprises a valve with a two-part valve housing, which in the parting region is provided with cavities, which are formed by complementary recesses in the two housing bodies on each side. The cavities in part constitute valve ducts and are in part fitted with functional elements, which include a valve member and a valve drive serving for the operation thereof.

The U.S. Pat. No. 5,341,846 discloses a valve means, which comprises a plurality of valves collected together in the form of a battery and which can be designed as suggested in the said European patent publication 0 643 811 B1.

In the case of a valve means disclosed in the German patent publication 4,324,939 A1 there is also a longitudinally divided valve housing structure. For actuation of the valve member two valve drives are employed, which however are designed as separate units and are externally mounted on the valve housing.

SHORT SUMMARY OF THE INVENTION

One object of the invention is to provide a valve means which is easy to assemble and mount but at the same time is compact.

In order to achieve these and/or other objects appearing from the present specification, claims and drawings, in the present invention a valve means comprises at least one valve, whose housing is longitudinally divided and comprises housing bodies arranged together alongside one another in a parting region, cavities in the parting region being defined by mutually complementary recesses in the housing bodies placed against each other, which cavities in part form valve ducts and in part being fitted with functional elements, such functional elements including at least one valve member and at least two electrically operable valve drives serving for the operation thereof.

The invention thus provides a valve means which comprises one or more valves, whose valve housings possess a plurality of housing bodies placed together in a parting region alongside one another which are firmly connected together by ultrasonic welding, by bonding or by some other connecting method. The cavities constituting the valve ducts and also serving for receiving the functional elements may be extremely simply produced by providing the housing bodies prior to fitting together with recesses on their joint face in the parting region, which recesses complement each other to form cavities in the assembled state of the housing bodies. The functional elements, like other necessary components of the valve as well, may consequently be inserted, in the course of assembly, extremely simply prior to putting the housing bodies together, in the recesses of the one housing body. In this respect at least one valve member is provided, which has two electrically operable drives for actuation, such drives also being accommodated in cavities in the valve housing so that external attachment is unnecessary. Because the recesses constituting the cavities may be produced extremely simply, it is possible to provide the best possible compact distribution of the valve member or members and of the valve drives in the parting region so that all essential components are accommodated in minimum space.

Further advantageous developments of the invention are defined in the claims.

It is preferred for the valve housing to have two tabular housing bodies placed against one another so that an extremely narrow design may be adopted.

In the case of the valve drives it is more particularly preferred to have structures, which have one or more solenoids or piezo-actuators. Using such valve drives it becomes possible, if required, to provide for direct actuation of the associated member. It is an advantage however to provide for a pilot operation of the valve, for which purpose the valve drives can be at least in part in the form of solenoid valves or of piezo-actuated valves.

Using a single valve member and two valve drives associated with such valve member it is readily possible to provide a 5/2 valve or a 5/3 valve. Preferably, the valve structure will be a pulse valve.

A particularly advantageous form of design has been found to be one with such a design of the valve housing that the parting region possesses a rectangular outline, the configuration preferably being elongated, it being possible for the corner regions to be rounded off. In any case with such a design it is an advantage for the two valve drives to be placed at two diagonally opposite corner regions of the parting region on either side of the associated valve, which for its part is on the other diagonal and preferably is orientated in the longitudinal direction thereof.

A plurality of valves can be collected together as a battery-like valve unit and associated with a fluid distributor and a signal distributor in order to render possible simple supply of pressure medium and electrical operating signals. The valves may be mounted on the fluid distributor and/or the signal distributor. Preferably, the fluid distributor and the signal distributor are collected together in a common distributor unit. In all cases it is convenient to provide the respective distributor with a longitudinally divided housing, the necessary fluid ducts and/or electrical lines extending in the parting region.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES

DETAILED ACCOUNT OF WORKING EMBODIMENT OF THE INVENTION

Figure 1:
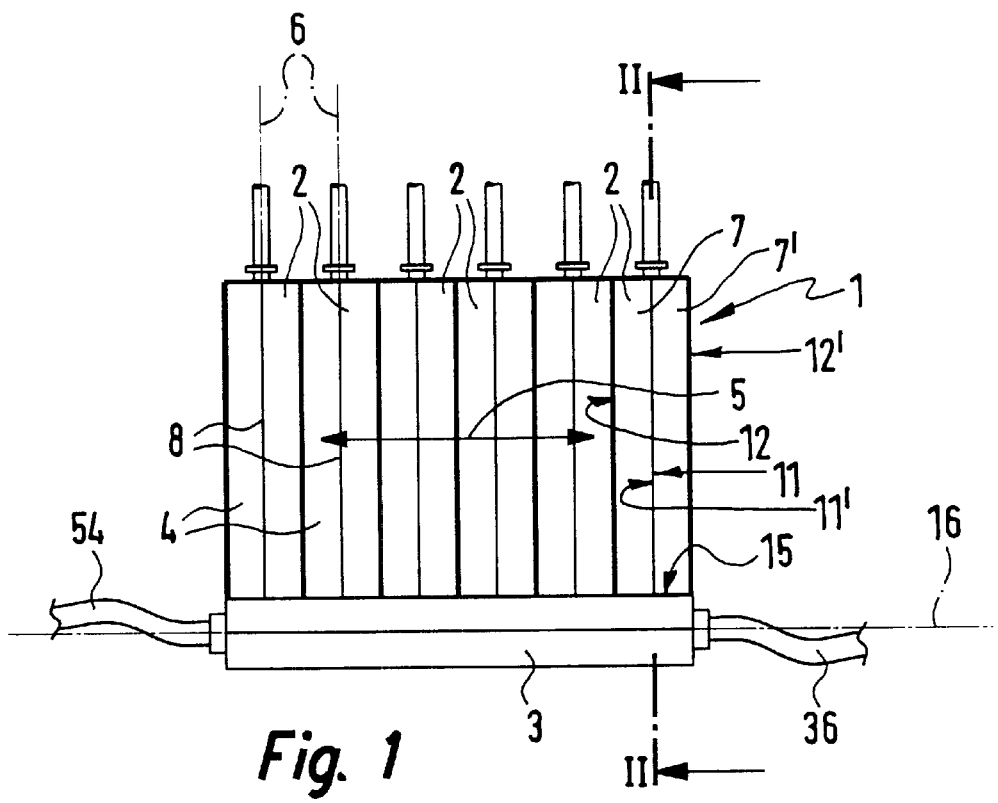
FIG. 1 shows a preferred constructional form of the valve means in accordance with the invention with a battery-like unit made up of valves, looking in the direction indicated by arrow I in FIG. 2.

The drawings show a valve means 1, which is provided with a plurality of valves 2 collected together as a battery-like unit and mounted on a distributor unit 3 having a preferably tabular structure.

Each valve 2 possesses a tabular valve housing 4, the valves 2 being so arranged one after the other as indicated by a double arrow in an array direction 5 that the principal planes 6 of extension of their valve housings 4 are at a right angle to the array direction 5 and among themselves extend in parallelism to each other. The valve housings 4 may abut one another at their facing external surfaces.

The housings 4 of the valves 2 are respectively longitudinally divided, the division into two present in the working embodiment being recommended so that each valve housing 4 comprises two longitudinally contacting and preferably tabular housing bodies 7 and 7'. The parting region 8, which in the working embodiment is in the form of a parting plane, extends in parallelism to the principal plane 6 of extension or coincides with same, as is the case in the working embodiment.

For forming the valve housing 4 the housing bodies 7 and 7' are permanently joined together, something that is conveniently done by bonding or welding. It is convenient to manufacture the housing bodies 7 and 7' of plastic material and to join the parts together by ultrasonic welding.

Figure 2:
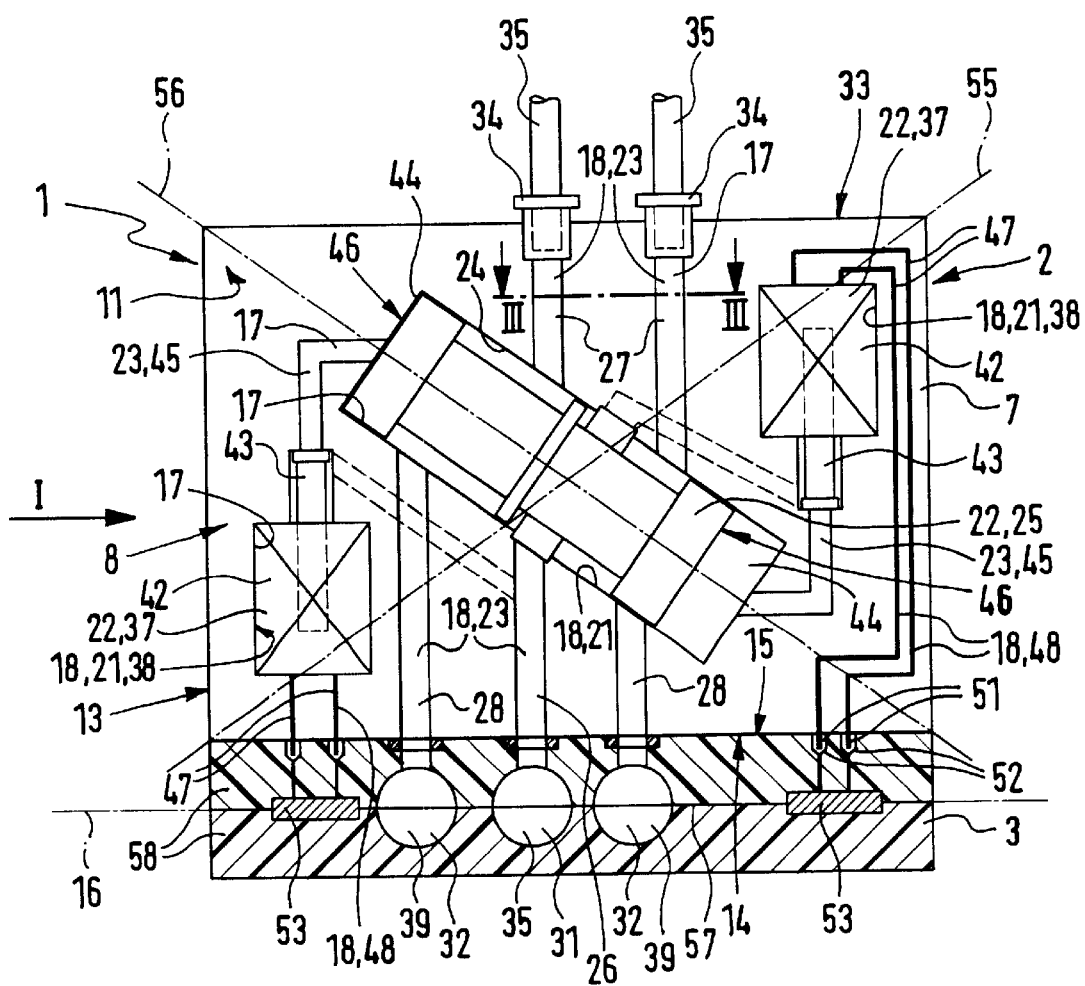
FIG. 2 is a section taken through the valve means of FIG. 1 on the section line II—II, the section line passing through the parting region of a valve.

FIG. 2 shows a cross section taken through the valve means 1 of FIG. 1, the plane of the section in the valve coinciding with the parting region 8. FIG. 2 consequently shows a view of the joint surface 11, facing the parting region 8, of the first housing body 7 of the respective valve housing 4. It is opposite to the joint surface 11', not visible in FIG. 2, of the second housing body 7' above the plane of the drawing.

The housing 4 of the valves 2 is preferably so designed that the parting region 8 visible in FIG. 2 has an elongated rectangular outline. Each joint surface 11 and 11' thus possesses a corresponding rectangular form of its edge. Unlike a square rectangular form this design renders possible a particularly compact design, it being quite possible however to provide smooth transitions between the individual external surface sections, for example by filleting the corner regions.

Each valve housing 4 possesses oppositely placed principal external surfaces 12 and 12' parallel to the principal plane 6 of extension and a narrow peripheral surface 13 which follows the outline of the parting region 8, such peripheral surface 13 being divided in the working embodiment by the four corner regions of the valve housing 4 into four peripheral surface sections. One of these peripheral surface sections constitutes a mounting surface 14, by means of which the respective valve 2 is mounted on an external surface, designed in the form of a fitting or component carrying surface 15, on the distributor unit 3. The same is here so orientated that its principal plane 16 of extent extends at a right angle to the principal planes 6 of extension of the valves 2, the component carrying surface 15 being located on one of the two major external surfaces of the distributor unit 3.

In what follows a description will be provided of the preferred structure of the individual valves 2.

Figure 3:
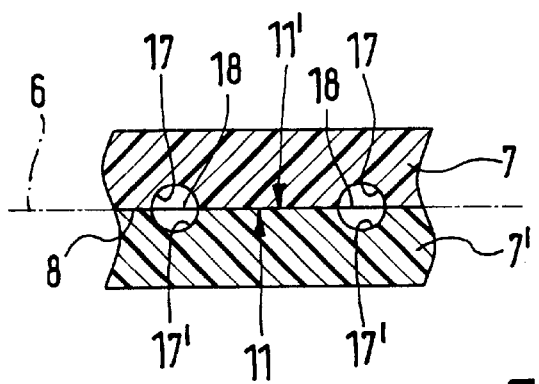
FIG. 3 is part of a cross section taken through the arrangement of FIG. 2 on the section line III—III therein.

At its joint surface 11 and 11' each housing body 7 and 7' possesses a plurality of recesses 17 and 17' as is indicated by way of example in FIG. 3. In FIG. 2 only the recesses 17 provided in the joint surface 11 of the first housing body 7 will be seen. Recesses 17 and 17' on either side are arranged with bilateral symmetry in relation to the parting region 8 and, respectively, to the principal plane 6 of extension so that in the assembled state of the housing bodies 7 and 7' they are complementary to each other and form cavities 18. Each recess 17 and 17' accordingly represents part of the volume of the respective cavity 18.

Some of the cavities 18 form receiving chambers 21 for functional elements 22 relevant as regards the valve function. Other cavities 18 represent valve ducts 23, which in part may produce a fluid link between individual functional elements 22.

In the illustrated working embodiment one of the receiving chambers 21 is designed in the form of an elongated valve member receiving chamber 24 wherein a linearly moving valve member 25 is received. The valve member 25 designed like a piston in the working embodiment.

At the periphery a plurality of valve ducts 23 open into the valve member receiving chamber 24. In the illustrated working embodiment it is here a question of a supply duct 26, two power fluid ducts 27 and two spent air venting ducts 28. The supply duct 26 and the venting ducts 28 open at the component carrying surface 14 and communicate there with the openings of a supply duct system 31 and a spent air duct system 32 integrated in the distributor unit 3.

The power ducts 27 extend to another point on the peripheral surface 13 and in the working example open at the peripheral surface section orientated oppositely to the component carrying surface 14, which surface section will be named a connection surface 33 in the following for better distinction. At the connection surface 33 the power ducts 27 are provided with suitable connection means 34, as for example plug connection means, which render possible releasable connection of fluid ducts 35, same leading to a load (which is not illustrated in detail) as for instance a fluid operated drive.

It is to be noted at this point that the valve means given 1 as an example, is provided for operation with compressed air. However it would be also to have it driven by hydraulic pressure medium.

The present valve is designed in the form of a 5/2 pulse valve. Its valve member 25 is able to be switched over between two positions of switching, in which it dwells until an opposite switching pulse arrives at it. In the one position of switching it affords a connection between the supply duct 26 and the one power duct 27, while simultaneously the other power duct 27 is connected with one of the spent air venting ducts 28. In the other position of switching there is a reversed association between the ducts.

It would be feasible, as an example, however to have a design of a valve with a 5/3 function, the valve member 25 also being able to assume a middle position, for example by the provision of a spring means arranged in the valve member receiving chamber 24.

The supply of the pressure medium takes place via the supply duct system 31 of the distributor unit 3. It comprises at least one central supply duct 35 extending in parallelism to the array direction 5 in the distributor unit 3, such duct 35 opening at an external surface of the distributor unit 3, where a fluid duct 36 can be connected which leads to a source of pressure fluid. The spent air venting system 32 also comprises one or more central spent air ducts 39, which in a similar manner lead to an external surface of the distributor unit 3, where they are best fitted with the a muffler means (not illustrated).

For the operation of the valve member 25 two functional elements 22 are provided which are placed in suitable valve drive receiving chambers 38. These valve drives 37 are in the form of solenoid valves in the working embodiment and comprise a solenoid drive 42 arranged to be operated by electrical actuating signals. The solenoid drive controls the control member 43 of the solenoid valve, it performing a valve member function and which, dependent on the position of switching, opens up the passage of fluid through an actuating duct 45 or closes it. The actuating duct 45, which for avoiding intersection with other valve ducts 23, may extend at least partially in its own separate duct plane—this being indicated by chained lines in FIG. 2—extends between the supply duct 26 and an operative section 44 constituted by a terminal section of the valve member receiving chamber 24. Because each respective operative section 44 is delimited by an operative surface 46 cooperating with the valve member 25, the effect of the pressure is that the valve member 25 is shifted in the one or the other direction.

Each valve drive 37 with the associated actuating duct 45 is responsible for moving the valve member 25 in one of the two possible directions.

Instead of solenoid valves it would be possible to provide piezo actuated valves as valve drives 37 for example. Furthermore it would be feasible to provide a direct mechanical actuation of the valve member 25 instead of pilot operation in the working embodiment, solenoids or peizo drives being employed as valve drives.

The valve drives 37 receive their electrical actuating signals via electrical conductors 47, which extend in signal ducts 48, which are also constituted by the cavities 18. The electrical conductors 47 may be formed by wires or cables in the ducts. It is convenient for them to extend from the valve drives 37 to the component carrying surface 14, where first contact means 51 are associated with them, such means being able to produce an electrical contact with second contact means 52 provided at the distributor unit 3.

The second contact means 52 are part of a signal conductor arrangement 53, which in the working example has two printed circuit boards, and which in the distributor unit 3 extends more particularly in the array direction 5 and leads to an external surface of the distributor unit 3. Here suitable connection means provide for the possibility of connection with an electronic control means, as for instance using an intermediate electrical cable 54. Here it may be a question of a field bus connection. A control means may also be provided as a direct component of the valve means 1.

The valves 2 of the working embodiment are characterized by an extremely compact accommodation of the functional elements 22 in the surface defining the parting region 8. This is achieved because the two valve drives 37 are arranged at two corner zones of the parting region 8, which are diagonally opposite to other, the associated first diagonal being referenced 55. The valve member receiving chamber 24 is placed between the two valve drives 37, same being preferably so aligned that its longitudinal axis coincides with the second diagonal 56, intersecting the first diagonal 55 of the parting region 8, or extends generally in parallelism to same.

Accordingly it is preferred for the valve member 25 to be placed on one of the diagonals, whereas the two associated valve drives are on either side of the valve member 25 on the other diagonal.

Instead of having only one valve member 25 it is also possible to have several valve members in the interior of valve housing 4, more particularly two thereof, which may be accommodated in one and the same valve member receiving chamber 24. In such a case it would be possible also for two respective valve drives to be collected together as a double drive so that again the distribution of the functional elements indicated in FIG. 2 would be possible.

For the attachment of the valves 2 on the distributor unit 3 suitable attachment means are provided, which are not illustrated in detail in the drawing. It is convenient for the arrangement to be such that on mounting and removal of a valve 2 the fluid power and electrical connections between such valve 2 and the distributor unit 3 would be simultaneously made or interrupted. However it would be possible for example to provide the first contact means 51 in a different peripheral surface section of the valve housing 4 to the component mounting surface 14.

Owing to the integration of the supply duct system, of the spent air venting duct system and of the signal line arrangement 53 the distributor unit represents a module composed of a fluid distributor and a signal distributor. In this respect it is preferred to employ a design principle similar to that of the design of the valves 2, because the distributor unit 3 is longitudinally divided and has two distributor bodies 58 placed against each other in a further parting region 57. The further parting region 57 extends conveniently in parallelism to the principal plane 16 of extension of the distributor unit 3 or coincides with same. For the formation of at least the central supply duct 35 and of the central spent air venting ducts 39 and preferably furthermore for the formation of cavities receiving the signal line arrangement 53 and any control means, the distributor bodies 58 are provided, like the housing bodies 7 and 7' in the further parting region 57 with mutually complementary cavities.

It is preferred for the distributor bodies 58 to be made of plastic material and for them to be permanently joined together by bonding or by ultrasonic welding.

The valve means 1 can both simultaneously comprise a plurality of valves 2 collected together as a unit or only comprise a single such valve 2, in the case of the use as a single valve it being possible to dispense with a distributor unit 3. The fluid power and electrical connections may in any case be provided directly on the valve housing 4.

What is claimed is:

1. A valve means comprising at least one valve, whose valve housing is longitudinally divided and comprises housing bodies arranged together alongside one another in a parting region, cavities in the parting region being defined by mutually complementary recesses in the housing bodies placed against each other, which cavities in part form valve ducts and in part being fitted with functional elements, such functional elements including at least one valve member and at least two electrically operable valve drives serving for the operation thereof, the two valve drives being disposed on diagonally opposite corner regions of the parting region.

2. The valve means as set forth in claim 1, wherein the valve housing comprises two tabular housing bodies placed against one another.

3. The valve means as set forth in claim 1, wherein the valve drives at least in part possess solenoids.

4. The valve means as set forth in claim 3, wherein the valve drives are at least in part in the form of solenoid valves.

5. The valve means as set forth in claim 1, wherein the valve drives at least in part possess piezo actuating means.

6. The valve means as set forth in claim 5, wherein the valve drives are at least in part in the form of piezo valves.

7. The valve means as set forth in claim 1, wherein such valve ducts formed by the cavities include actuating ducts, which extend between the valve drives and a valve member receiving chamber containing at least one valve member and formed also by the cavities.

8. The valve means as set forth in claim 1, wherein the valve is designed to function as a 5/2.

9. The valve means as set forth in claim 1, wherein the valve is designed in the form of a pulse operated valve.

10. The valve means as set forth in claim 1, having a parting region with an elongated outline.

11. The valve means as set forth in claim 1, having a parting region with a rectangular outline.

12. The valve means as set forth in claim 1, wherein at least one valve member receiving chamber formed by the cavities and containing at least one valve member extends generally along a diagonal of the parting region.

13. The valve means as set forth in claim 12, having a parting region with two intersecting outline diagonals, at least one valve member being placed on one of the diagonals and the two associated valve drives being placed on the other diagonal.

14. The valve means as set forth in claim 1, wherein two valve drives are arranged adjacent to two mutually opposite longitudinal sides of the valve member.

15. The valve means as set forth in claim 1, wherein the cavities are in part in the form of signal ducts, in which electrical conductors leading to the valve drives extend.

16. The valve means as set forth in claim 1, having several valves collected together as a battery-like unit.

17. The valve means as set forth in claim 16, wherein the valves are provided with a fluid distributor having at least one supply duct system.

18. The valve means as set forth in claim 17, wherein the valves are provided with a signal distributor serving for the supply of actuating signals and wherein the fluid distributor and the signal distributor are together placed in a distributor unit.

19. The valve means as claimed in claim 18 wherein the signal distributor and, the distributor unit each possess a longitudinally divided housing with fluid ducts and/or electrical conductors extending in the parting region.

20. The valve means as set forth in claim 17, wherein the fluid distributor possesses a longitudinally divided housing with fluid ducts and/or electrical conductors extending in the parting region.

21. The valve means as set forth in claim 16, wherein the valves are provided with a signal distributor serving for the supply of actuating signals.

* * * * *